(12) United States Patent
Zhao

(10) Patent No.: US 8,721,368 B2
(45) Date of Patent: May 13, 2014

(54) POWER TERMINAL CONNECTOR AND SYSTEM

(75) Inventor: Weiping Zhao, Superior Township, MI (US)

(73) Assignee: Tyco Electronics Corporation, Berwyn, PA (US)

( * ) Notice: Subject to any disclaimer, the term of this patent is extended or adjusted under 35 U.S.C. 154(b) by 52 days.

(21) Appl. No.: 13/267,638

(22) Filed: Oct. 6, 2011

(65) Prior Publication Data

US 2013/0089996 A1   Apr. 11, 2013

(51) Int. Cl.
*H01R 33/00* (2006.01)

(52) U.S. Cl.
USPC .......................... 439/627; 439/350; 439/500

(58) Field of Classification Search
USPC .................. 439/500, 840, 350, 627
See application file for complete search history.

(56) References Cited

U.S. PATENT DOCUMENTS

| | | | | |
|---|---|---|---|---|
| 3,208,030 | A | * | 9/1965 | Evans et al. ................... 439/290 |
| 4,042,759 | A | | 8/1977 | Cella |
| 4,830,624 | A | | 5/1989 | Rose et al. |
| 5,576,516 | A | * | 11/1996 | Kameyama et al. ....... 174/138 F |
| 5,886,501 | A | | 3/1999 | Marks et al. |
| 5,931,690 | A | * | 8/1999 | Sai et al. ....................... 439/350 |
| 6,410,875 | B2 | * | 6/2002 | Allard et al. ................... 218/118 |
| 6,974,329 | B2 | * | 12/2005 | Henneberg ...................... 439/59 |
| 7,229,327 | B2 | | 6/2007 | Zhao et al. |
| 7,294,020 | B2 | | 11/2007 | Zhao et al. |
| 7,458,862 | B2 | * | 12/2008 | Zhao et al. .................... 439/840 |
| 7,549,889 | B2 | | 6/2009 | Sikora |
| 2006/0270277 | A1 | | 11/2006 | Zhao et al. |
| 2006/0270286 | A1 | | 11/2006 | Zhao et al. |
| 2007/0232154 | A1 | | 10/2007 | Zhao et al. |

FOREIGN PATENT DOCUMENTS

| | | |
|---|---|---|
| DE | 84 26 772 U1 | 11/1984 |
| JP | 6 140020 A | 5/1994 |
| JP | 9 092259 A | 4/1997 |
| WO | 2013 / 023846 A1 | 2/2013 |

OTHER PUBLICATIONS

Kostal; Automobile connectors for high voltage (HV) applications; 5 pg.s.
International Search Report, International Application No. PCT/US2012/058510, International Filing Date, Mar. 10, 2012.

* cited by examiner

*Primary Examiner* — Truc Nguyen

(57) ABSTRACT

A power terminal connector includes a multi-layered buss bar that has a first mounting portion, a second mounting portion and a flexible section between the first and second mounting portions. The flexible section has multiple layers of metal sheets in a stacked configuration. A first terminal assembly is coupled to the first mounting portion and a second terminal assembly is coupled to the second mounting portion. The first and second terminal assemblies are coupled to corresponding pins of corresponding power terminals. The multi-layered buss bar is configured to electrically interconnect the power terminals coupled to the first and second terminal assemblies.

20 Claims, 6 Drawing Sheets

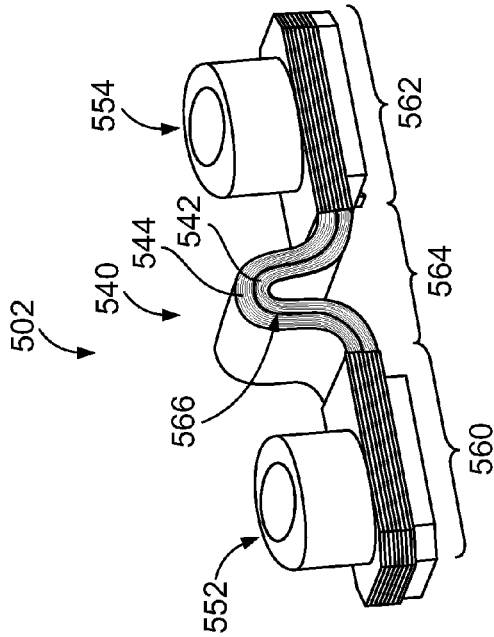
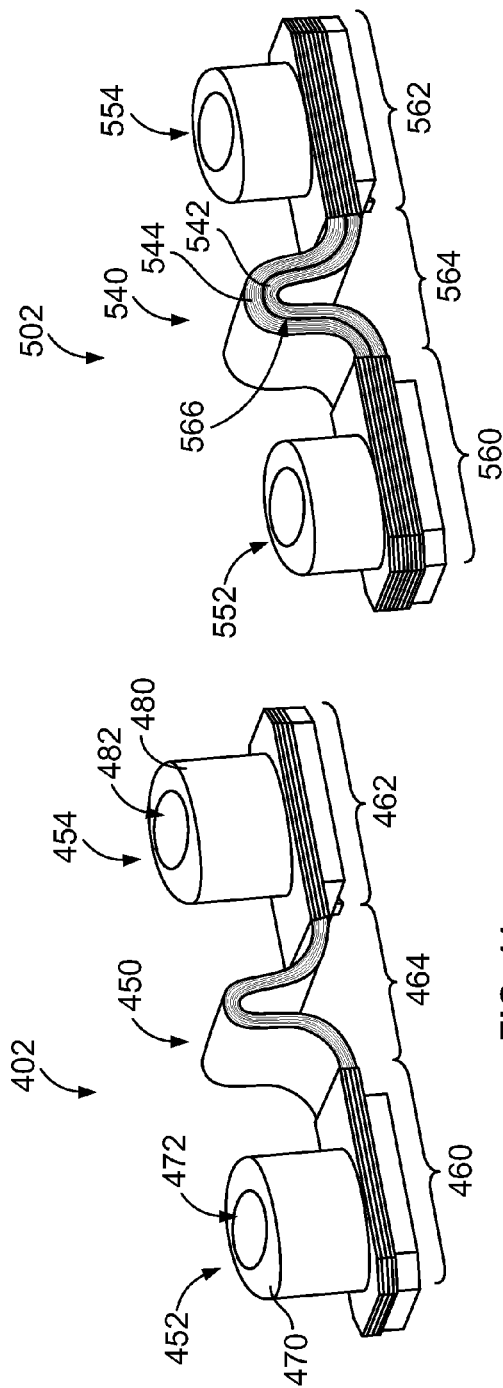
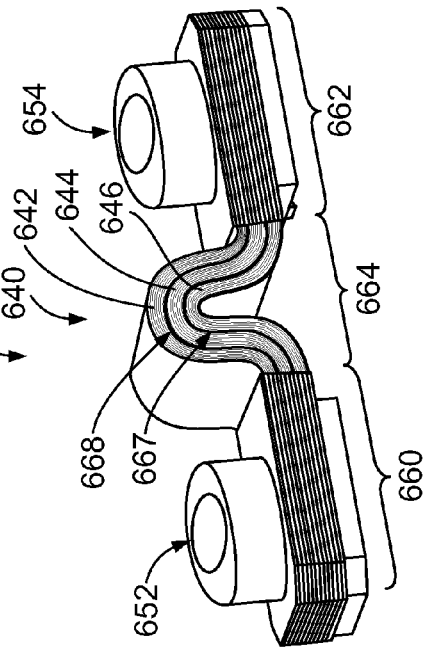

US 8,721,368 B2

POWER TERMINAL CONNECTOR AND SYSTEM

BACKGROUND OF THE INVENTION

The subject matter herein relates generally to connector systems having power terminal connectors.

Power terminal connectors are used in different types of connector systems. One application is an automotive application, such as for connection to a battery of a vehicle. In some applications, spacing around the battery, such as above the battery, in front of the battery, to one side or the other of the battery, may be limited. There may not be room for a power terminal connector to extend into such space, or there may not be room around the battery to get a tool for connecting and un-connecting the power terminal connector to the power terminal of the battery. Additionally, connecting and un-connecting the power terminal connector to the power terminal of the battery may be time consuming or require special, expensive tools.

In some applications, two batteries need to be connected together in series or in parallel and a power terminal connector is needed to connect the power terminal of one battery to the power terminal of another battery. Problems arise in connecting one battery to another battery. For example, the spacing between the batteries may vary from application to application. The position tolerance has a wide range between any adjacent two batteries. Additionally, vibration may cause the batteries to move relative to one another. There is a need for a flexible connection in such applications. Some battery to battery connections use a flexible connection, however the flexible connection is connected using bolt and nut connectors which have over-torque, under-torque, cross-thread and spacing problems. Connecting such flexible connections is labor intensive and time consuming.

Some known connections, such as the electrical terminal of U.S. Pat. No. 7,294,020 to Zhao, may be easily terminated to the terminal of the batteries, however such electrical terminals have problems. The electrical terminal uses a single thickness terminal body. When such electrical connectors are required to carry a high current, such as more than 80 Amps, the thickness of the terminal body must be increased, making the electrical connector too inflexible for the application. The electrical connector is unsuitable for carrying high current.

A need remains for a flexible power terminal connector that may be connected between power terminals in an efficient manner. A need remains for a power terminal connector that does not sacrifice current carrying, robustness, and/or package ability for flexibility, and vice versa.

BRIEF DESCRIPTION OF THE INVENTION

In one embodiment, a power terminal connector is provided having a multi-layered buss bar that has a first mounting portion, a second mounting portion and a flexible section between the first and second mounting portions. The flexible section has multiple layers of metal sheets in a stacked configuration. A first terminal assembly is coupled to the first mounting portion and a second terminal assembly is coupled to the second mounting portion. The first and second terminal assemblies are coupled to corresponding pins of corresponding power terminals. The multi-layered buss bar is configured to electrically interconnect the power terminals coupled to the first and second terminal assemblies.

In another embodiment, a power terminal connector is provided having a multi-layered buss bar that has a first mounting portion, a second mounting portion and a flexible section between the first and second mounting portions. The flexible section has multiple layers of metal sheets in a stacked configuration. A first terminal assembly is coupled to the first mounting portion and a second terminal assembly is coupled to the second mounting portion. The first and second terminal assemblies each include a terminal body that is separately provided from, and coupled to, the corresponding mounting portion. The terminal body has a socket configured to receive, and be electrically connected to, a pin of a corresponding power terminal. A spring clip is coupled to the terminal body. The spring clip is movable between a locking position and a clearance position. The spring clip is configured to engage the pin in the locking position to secure the corresponding terminal assembly to the pin. The spring clip is configured to be disengaged from the pin in the clearance position. A cap that is movable with respect to the terminal body is coupled to the spring clip to move the spring clip between the locking position and the clearance position as the cap is actuated. The multi-layered buss bar electrically couples the terminal bodies of the first and second terminal assemblies to electrically interconnect the pins received therein.

In a further embodiment, a connector system is provided having a first header with a first power terminal including a pin and a second header with a second power terminal including a pin. A power terminal connector is coupled to and electrically interconnects the first and second power terminals. The power terminal connector includes a multi-layered buss bar having a first mounting portion, a second mounting portion and a flexible section between the first and second mounting portions. The flexible section has multiple layers of metal sheets in a stacked configuration. A first terminal assembly coupled to the first mounting portion and a second terminal assembly coupled to the second mounting portion. The first and second terminal assemblies are coupled to the first and second pins, respectively. The multi-layered buss bar electrically couples the first and second terminal assemblies to electrically interconnect the pins received therein.

BRIEF DESCRIPTION OF THE DRAWINGS

FIG. 11 is a side perspective view of a power terminal connector formed in accordance with an exemplary embodiment.

FIG. 12 is a side perspective view of a power terminal connector formed in accordance with an exemplary embodiment.

FIG. 13 is a side perspective view of a power terminal connector formed in accordance with an exemplary embodiment.

DETAILED DESCRIPTION OF THE INVENTION

Figure 1:
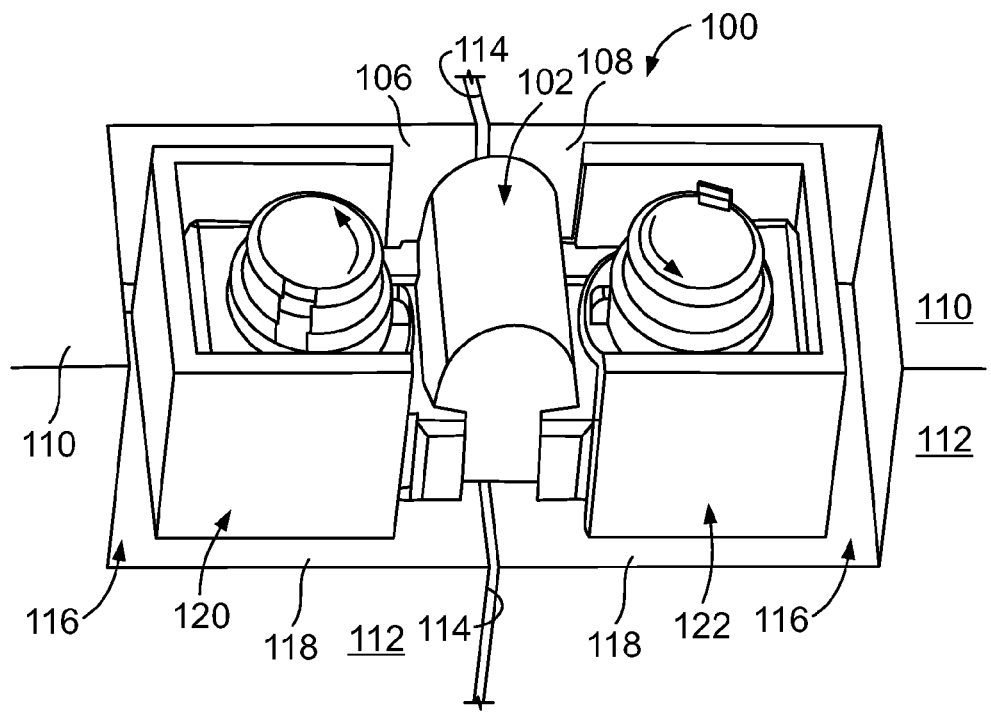
FIG. 1 illustrates a connector system formed in accordance with an exemplary embodiment.

FIG. 1 illustrates a connector system 100 formed in accordance with an exemplary embodiment. The connector system 100 includes a power terminal connector 102 that uses a flexible, multi-layered buss bar to electrically connect power terminals 104, 105 (shown in FIG. 2) of components, such as batteries 106, 108. The power terminal connector 102 illustrated in the Figures is illustrative of an exemplary embodiment, but may have other shapes, components or features in alternative embodiments. The power terminal connector 102 electrically connects the batteries 106, 108. The power terminal connector 102 represents a buss or jumper that interconnects the batteries 106, 108. The batteries 106, 108 may be any voltage battery used in a vehicle. Optionally, the vehicle may be an electrical or hybrid electric vehicle and the batteries 106, 108 may be used as part of the power system for the electric vehicle or hybrid electrical vehicle.

Figure 2:
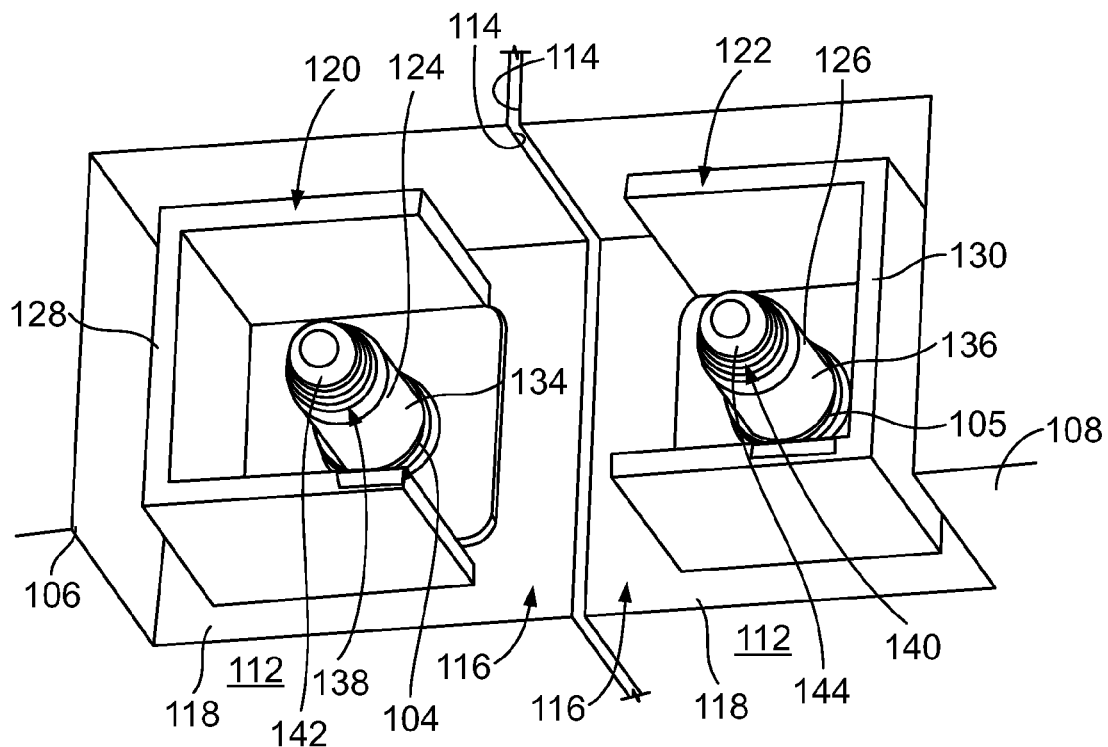
FIG. 2 illustrates a portion of the connector system.

The power terminal connector 102 is a quick connect/quick disconnect type of connector that may be easily and quickly terminated to the power terminals 104, 105 (shown in FIG. 2). The power terminal connector 102 has a very low profile so as to conserve space around the batteries 106, 108. Other types of power terminal connectors may be used in alternative embodiments that use a flexible buss bar to interconnect the batteries 106, 108 or other electrical components.

Each of the batteries 106, 108 includes a top 110, a front 112 perpendicular to the top 110, and a side 114 perpendicular to the top 110 and the front 112. The sides 114 of the batteries 106, 108 face one another. The top 110, front 112 and side 114 generally meet at a corner of the battery 106, 108. In an exemplary embodiment, the battery 106, 108 includes a notched-out area 116 at the corner. The notched-out area 116 is recessed below the top 110, behind the front 112, and inward from the side 114. The notched-out area 116 defines a window or envelope defined by planes extending along the top 110, front 112 and side 114.

The power terminal connector 102 spans across the interface between the sides 114 of the batteries 106, 108 and is positioned in both notched-out areas 116. The battery 106, 108 includes a mounting pad 118 at the bottom of the notched-out area 116. The power terminals 104, 105 (shown in FIG. 2) extend from the corresponding mounting pad 118. In an exemplary embodiment, the power terminal connector 102 is a flexible connector that allows relative movement between the batteries 106, 108. The power terminal connector 102 spans across the interface between the sides 114 and accommodates different spacing between the batteries 106, 108, movement of the batteries 106, 108, such as from vibration, and the like.

A first header 120 is coupled to the mounting pad 118 of the first battery 106 and a second header 122 is coupled to the mounting pad 118 of the second battery 108. The power terminal connector 102 is coupled to the headers 120, 122. In an exemplary embodiment, the headers 120, 122 are received in the notched-out areas 116 such that the headers 120, 122 do not extend beyond the top 110, the front 112 or the side 114. The power terminal connector 102 is coupled to the headers 120, 122 such that the power terminal connector 102 does not extend beyond (e.g., above) the tops 110 of the batteries 106, 108. The power terminal connector 102 is coupled to the headers 120, 122 such that the power terminal connector 102 does not extend beyond (e.g., outward from) the fronts 112 of the batteries 106, 108. As such, other components, such as another battery may be positioned immediately in front of the batteries 106, 108 without interference from the headers 120, 122 or the power terminal connector 102. Another component, such as a cover or lid may extend along the tops 110 of the batteries 106, 108 without interference from the headers 120, 122 or the power terminal connector 102. In an alternative embodiment, the batteries 106, 108 may not include the notched out areas 118, but rather the headers 120, 122 may be provided on the tops 110 of the batteries 106, 108.

FIG. 2 illustrates a portion of the batteries 106, 108 showing the notched-out areas 116 with the headers 120, 122 coupled to the batteries 106, 108 at corresponding notched areas 116. In an exemplary embodiment, the headers 120, 122 are fixed connectors of the batteries 106, 108 providing an interface for the power terminal connector 102 (shown in FIG. 1). The headers 120, 122 include the power terminals 104, 105, respectively.

The power terminals 104, 105 includes pins 124, 126, respectively, extending from, and electrically coupled to, the batteries 106, 108. The pins 124, 126 extend along pin axes (e.g. central axes extending from tips to bases of the pins 124, 126). Optionally, the pins 124, 126 may extend generally parallel to the fronts 112 and the sides 114. The pins 124, 126 extend from the mounting pads 118.

The headers 120, 121 include header shrouds 128, 130 that partially surround the power terminals 104, 105. The header shrouds 128, 130 are defined by shroud walls. In an exemplary embodiment, the shroud walls may be box-shaped. The header shrouds 128, 130 may have open tops and open front sides. In an exemplary embodiment, the shroud walls are non-conductive and protect against inadvertent touching of the power terminals 104, 105.

The pins 124, 126 include outer contact surfaces 134, 136. The pins 124, 126 have grooves 138, 140 proximate to the distal ends thereof. Pin heads 142, 144 are defined above the grooves 138, 140 such that the pins 124, 126 have a larger diameter portion above the grooves 138, 140. The grooves 138, 140 are a smaller diameter portion of the pins 124, 126. Optionally, the pin heads 142, 144 may be plastic caps to make the pins 124, 126 touch safe.

During assembly, the power terminal connector 102 is loaded into the header shrouds 128, 130 through the open tops thereof. When the power terminal connector 102 is connected to the power terminals 104, 105, the terminal power connector 102 electrically connects the power terminals 104, 105. When the power terminal connector 102 is coupled to the pins 124, 126, portions of the power terminal connector 102 are received in the grooves 138, 140 to secure the power terminal connector 102 to the pins 124, 126. In an exemplary embodiment, the power terminal connector 102 cannot be inadvertently released from the pins 124, 126. Rather, a deliberate action is taken to release the power terminal connector 102 from the grooves 138, 140, after which the power terminal connector 102 may be lifted off the pins 124, 126 in a direction parallel to the pin axes. The power terminal connector 102 is a quick connect type connector that may be quickly and easily coupled to the pins 124, 126. The power terminal connector 102 may be coupled to the pins 124, 126 without the use of any tools. The power terminal connector 102 may be coupled by simply pressing the power terminal connector 102 onto the pins 124, 126 in a downward direction without any other actuation, locking or latching required.

Figure 3:
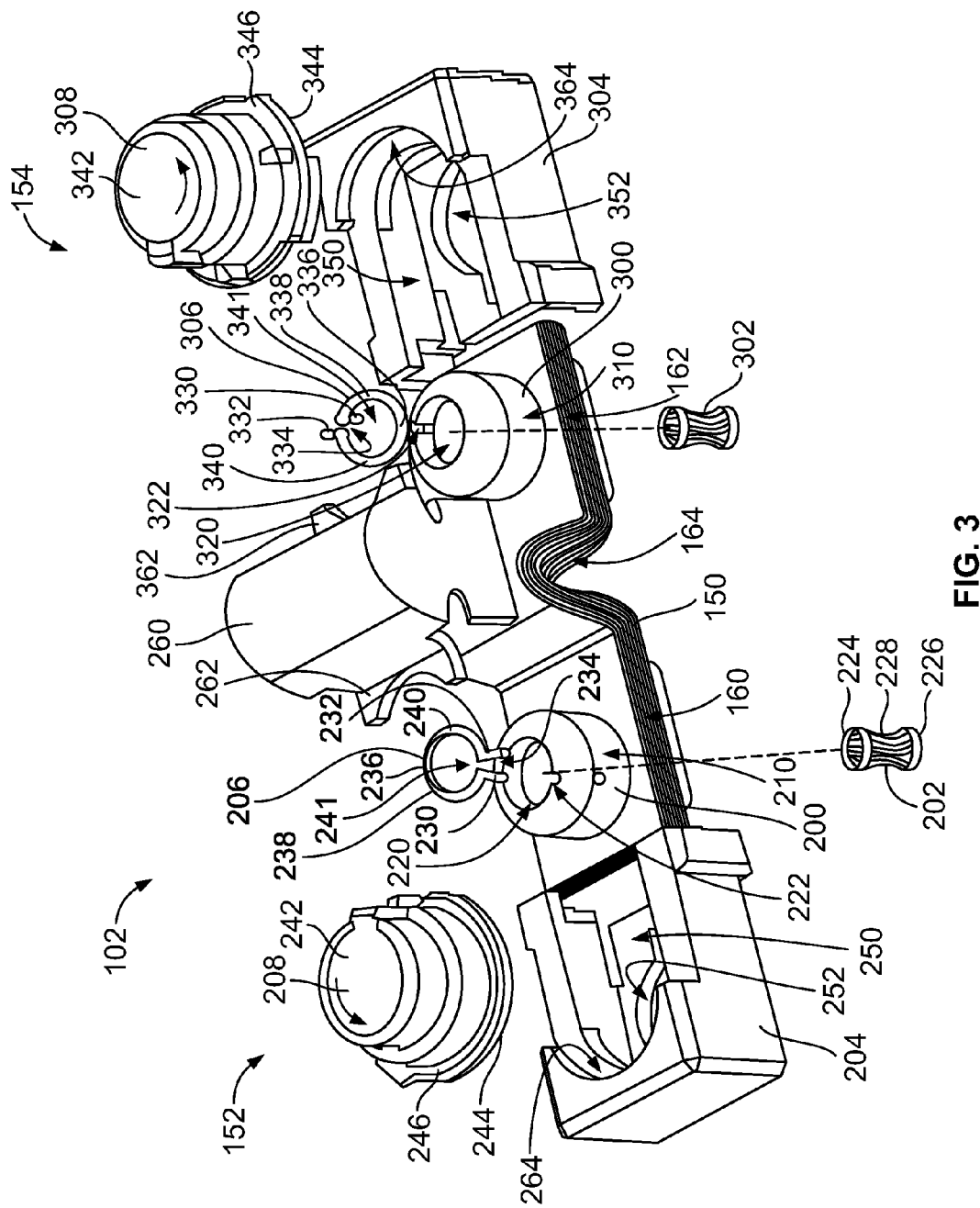
FIG. 3 is an exploded view of a power terminal connector of the connector system.

FIG. 3 is an exploded view of the power terminal connector 102. The power terminal connector 102 includes a multi-layered buss bar 150, a first terminal assembly 152 coupled to the multi-layered buss bar 150 and a second terminal assembly 154 coupled to the multi-layered buss bar 150. The first terminal assembly 152 is configured to be coupled to the first pin 124 (shown in FIG. 2). The second terminal assembly 154 is configured to be coupled to the second pin 126 (shown in FIG. 2). Optionally, multiple buss bars may be used to interconnect the first and second pins 124, 126, such as illustrated in the embodiments shown in FIGS. 12 and 13. The first and second terminal assemblies 152, 154 are quick connection assemblies that are configured to be releasably coupled to the pins 124, 126 of corresponding power terminals 104, 105 (shown in FIG. 2). Other types of terminal assemblies may be used in alternative embodiments with the multi-layered buss bar 150 to interconnect the power terminals 104, 105.

The multi-layered buss bar 150 includes a first mounting portion 160, a second mounting portion 162 and a flexible section 164 between the first and second mounting portions 160, 162. The first terminal assembly 152 is coupled to the first mounting portion 160. The second terminal assembly 154 is coupled to the second mounting portion 162. In an exemplary embodiment, the first mounting portion 160, second mounting portion 162 and/or flexible section 164 have multiple layers of metal sheets in a stacked configuration. Optionally, the layers may be laminated. The flexible section 164 is configured to change shape to change the relative position of the first and second mounting portions 160, 162. The flexible section 164 may be lengthened or shortened to variably position the first mounting portion 160 with respect to the second mounting portion 162. The multi-layered buss bar 150 is electrically conductive. In an exemplary embodiment, the multi-layered buss bar 150 is manufactured from copper, however other materials may be used in alternative embodiments. In an exemplary embodiment, the first mounting portion 160, second mounting portion 162 and flexible section 164 are integral and formed from a single piece of copper. Optionally, more than one piece of copper may be used to form the buss bar, such as multiple sheets of copper. The first mounting portion 160, second mounting portion 162 and flexible section 164 may be a multi-layered structure.

The first terminal assembly 152 includes a terminal body 200 that is configured to be electrically connected to the multi-layered buss bar 150 and the pin 124. In an exemplary embodiment, the terminal body 200 is separately provided from, and coupled to, the multi-layered buss bar 150. The first terminal assembly 152 includes a contact spring 202 that is received in the terminal body 200. The contact spring 202 is used to electrically connect the terminal body 200 to the pin 124. The first terminal assembly 152 includes a housing 204 that receives and at least partially surrounds the terminal body 200 and the first mounting portion 160. The housing 204 protects the multi-layered buss bar 150 and the terminal body 200 from inadvertent touching by a person or a tool, which could cause electrical shock that could injure the person.

The first terminal assembly 152 includes a spring clip 206 that is used to secure the power terminal connector 102 to the pin 124. The first terminal assembly 152 includes a cap 208 that is configured to be rotatably coupled to the terminal body 200. The cap 208 is used to actuate the spring clip 206 to unlock the power terminal connector 102 from the pin 124, as described in further detail below. The cap 208 may be configured to be actuated by means other than rotation in alternative embodiments, such as by pressing the cap in a linear direction. The interaction between the cap 208, spring clip 206, housing 204 and/or terminal body 200 may be different in such alternative embodiments.

The terminal body 200 includes a socket 210 that is configured to receive the pin 124. The socket 210 includes a hollow chamber 220. Optionally, the chamber 220 may be open at both ends thereof for receiving the pin 124 through the bottom end of the socket 210. In an exemplary embodiment, the outer surface of the socket 210, as well as the inner surface defining the chamber 220, are generally cylindrical in shape. Other shapes are possible in alternative embodiments. The chamber 220 receives the contact spring 202 therein for mating with the pin 124.

The top of the socket 210 includes a pocket 222 that receives a portion of the spring clip 206. In the illustrated embodiment, the pocket 222 is provided at the top of the socket 210 and extends generally parallel to a longitudinal axis of the socket 210. The pocket 222 receives an end of the spring clip 206 to hold the end of the spring clip 206 in position relative to the terminal body 200.

The contact spring 202 extends between a first end 224 and a second end 226. The contact spring 202 has a circumferential band at the first end 224 and another circumferential band at the second end 226. A plurality of spring beams 228 extend between the circumferential bands at the first and second ends 224, 226. In the illustrated embodiment, the spring beams 228 are inwardly tapered towards the middle of the contact spring 202. The contact spring 202 is necked-down at the middle of the contact spring 202. The contact spring 202 has a smaller diameter at the middle of the contact spring 202 and larger diameters at the first and second ends 224, 226. The necked-down portion of the contact spring 202 is configured to engage the pin 124. The first and second ends 224, 226 are configured to engage the socket 210 when the contact spring 202 is loaded into the chamber 220. In an exemplary embodiment, the spring beams 228 are deflectable and may be deflected outward when the pin 124 is loaded into the contact spring 202. The contact spring 202 defines an electrical path between the pin 124 and the terminal body 200.

The spring clip 206 has a curved shape and extends between a first end 230 and a second end 232. The spring clip 206 has an open side 234 with the first and second ends 230, 232 opposing one another at the open side 234. The spring clip 206 has a closed side 236 opposite the open side 234. The spring clip 206 has a first arm 238 and a second arm 240 joined at the closed side 236. The first arm 238 extends to the first end 230. The second arm 240 extends to the second end 232. An opening 241 is created between the first and second arms 238, 240.

In an exemplary embodiment, the first and second end 230, 232 may be moved away from one another to spread the first and second arms 238, 240 apart from one another. When the first and second arms 238, 240 are spread apart from one another, the size of the opening 241 therebetween is enlarged.

The spring clip 206 is movable between a locking position and a clearance position. The spring clip 206 is configured to engage the pin 124 in the locking position to secure to the power terminal connector 102 to the power terminal 104. The spring clip 206 is configured to be disengaged from the pin 124 in the clearance position. Optionally, in the locking position, the first and second ends 230, 232 are relatively close to one another. The first and/or second end 230, 232 are moved away from one another to enlarge the size of the opening of the spring clip 206 as the spring clip 206 is moved to the clearance position. The spring clip 206 is elastically deformed as the spring clip 206 is moved from the locking position to the clearance position. When the first and second ends 230, 232 are no longer forced apart from one another, the spring clip 206 returns to the normal locking position.

In an exemplary embodiment, the first end 230 is configured to be securely coupled to the terminal body 200. In an exemplary embodiment, the first end 230 is configured to be received in the pocket 222. The first end 230 is fixed in position relative to the socket 210 when the first end 230 is received in the pocket 222. The second end 232 is configured to be coupled to the cap 208. As the cap 208 is rotated, the second end 232 is moved with respect to the first end 230 to move the spring clip 206 from the locking position to the clearance position. Rotation of the cap 208 opens or enlarges the ring shape of the spring clip 206 because the first end 230 is fixed in the pocket 222.

In the illustrated embodiment, the second end 232 extends radially outward, while the first end 230 extends axially outward. The first end 230 is oriented generally perpendicular with respect to the second end 232. Other orientations of the first and second ends 230, 232 are possible in alternative embodiments. The first end 230 may be secured to the terminal body 200 by alternative means in alternative embodiments.

The cap 208 includes a top 242 and a bottom 244. The cap 208 is hollow and is configured to be placed over the socket 210. The cap 208 includes a rim 246 at the bottom 244. The cap 208 is configured to be rotatably coupled to the terminal body 200. In an exemplary embodiment, the housing 204 is used to secure the cap 208 in position with respect to the terminal body 200 and the spring clip 206. The cap 208 is rotatable with respect to the housing 204.

The housing 204 is coupled to the multi-layered buss bar 150 and/or the terminal body 200. The housing 204 is manufactured from a dielectric material, such as a plastic material. The housing 204 includes a chamber 250 that receives the first mounting portion 160 therein. The chamber 250 is open at a side of the housing 204 for loading the multi-layered buss bar 150 into the housing 204. An opening 252 in a bottom of the housing 204 is configured to be aligned with the terminal body 200 to allow the pin 124 to pass through the housing 204 into the terminal body 200. The housing 204 covers the multi-layered buss bar 150 and surrounds the terminal body 200 to prevent inadvertent touching of the multi-layered buss bar 150 and the terminal body 200 by a person or another component such as a tool, a wire and the like.

In an exemplary embodiment, the housing 204 cooperates with a spacer 260 placed over the flexible section 164 to capture the cap 208 and to completely encase the multi-layered buss bar 150 and terminal body 200 to make the power terminal connector 102 touch safe. The spacer 260 extends alongside the socket 210. The spacer 260 includes a tab 262 used to hold the cap 208 in place on the multi-layered buss bar 150. For example, the rim 246 of the cap 208 is captured under the tab 262.

The housing 204 includes a pocket 264 that is configured to receive the rim 246 of the cap 208. The cap 208 is captured in the pocket 264 to secure the cap 208 above the multi-layered buss bar 150 and the terminal body 200. The cap 208 is rotatable within the pocket 264 and under the tab 262.

The second terminal assembly 154 is similar to the first terminal assembly 152, but is coupled to the second mounting portion 162. The second terminal assembly 154 includes a terminal body 300 that is configured to be electrically connected to the multi-layered buss bar 150 and the pin 126. In an exemplary embodiment, the terminal body 300 is separately provided from, and coupled to, the multi-layered buss bar 150. The second terminal assembly 154 includes a contact spring 302 that is received in the terminal body 300. The second terminal assembly 154 includes a housing 304 that receives and at least partially surrounds the terminal body 300 and the second mounting portion 162. The second terminal assembly 154 includes a spring clip 306 that is used to secure the power terminal connector 102 to the pin 126. The second terminal assembly 154 includes a cap 308 that is configured to be rotatably coupled to the terminal body 300. The cap 308 is used to actuate the spring clip 306 to unlock the power terminal connector 102 from the pin 126.

The terminal body 300 includes a socket 310 having a hollow chamber 320. The top of the socket 310 includes a pocket 322 that receives a portion of the spring clip 306. The contact spring 302 is received in the chamber 320. The contact spring 302 may be identical to the contact spring 202.

The spring clip 306 may be identical to the spring clip 206. The spring clip 306 extends between a first end 330 and a second end 332. The spring clip 306 has an open side 334, a closed side 336, a first arm 338 and a second arm 340. An opening 341 is created between the first and second arms 338, 340. The spring clip 306 is movable between a locking position and a clearance position. The spring clip 306 is configured to engage the pin 126 in the locking position to secure to the power terminal connector 102 to the power terminal 105. The spring clip 306 is configured to be disengaged from the pin 126 in the clearance position.

The cap 308 includes a top 342 and a bottom 344 with a rim 346 at the bottom 344. The cap 308 is configured to be rotatably coupled to the terminal body 300.

The housing 304 includes a chamber 350 that receives the second mounting portion 162 therein. An opening 352 in a bottom of the housing 304 is configured to be aligned with the terminal body 300 to allow the pin 126 to pass through the housing 304 into the terminal body 300. The housing 304 cooperates with the spacer 260 to capture the cap 308. The spacer 260 includes a tab 362 used to hold the cap 308 in place on the multi-layered buss bar 150. The housing 304 includes a pocket 364 that is configured to receive the rim 346 of the cap 308. The cap 308 is rotatable within the pocket 364 and under the tab 362.

Figure 4:
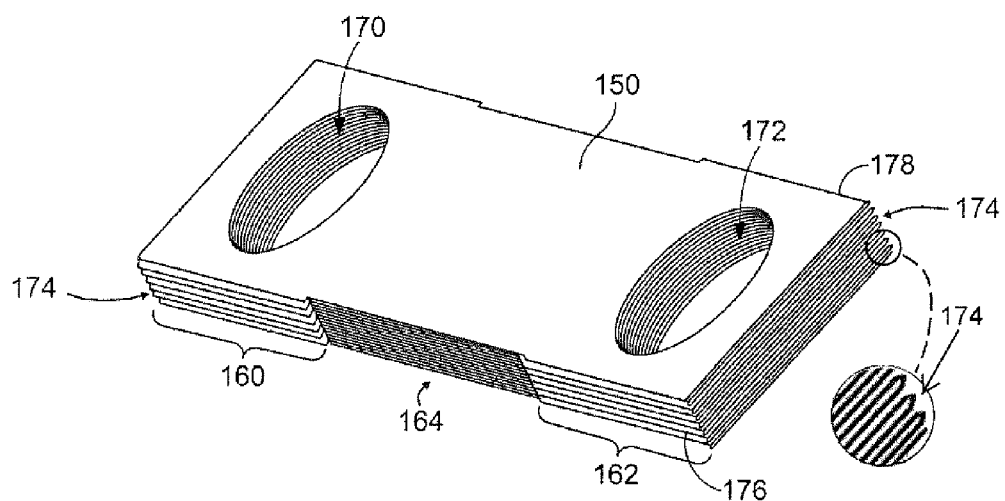
FIG. 4 is a top perspective view of a multi-layered buss bar of the power terminal connector shown in FIG. 3.

FIG. 4 is a top perspective view of the multi-layered buss bar 150 at a pre-formed configuration. The first mounting portion 160 includes an opening 170 extending there through. The second mounting portion 162 includes an opening 172 extending there through. The openings 170, 172 are configured to receive the terminal bodies 200, 300 (both shown in FIG. 3).

In an exemplary embodiment, the multi-layered buss bar 150 is manufactured from a thin copper sheet. The copper sheet is folded over multiple times to define multiple layers of copper sheets in a stacked configuration spanning the first mounting portion 160, the second mounting portion 162 and the flexible section 164. Optionally, the copper sheets may be laminated. A fold 174 is defined at each folded over portion of the copper sheet. The folds 174 are positioned at sides 176, 178 of the multi-layered buss bar 150. In the illustrated embodiment, the copper sheet is folded over approximately 15 times to define approximately 16 layers of copper sheets, however the flexible sheet may be folded over any number of times. Optionally, gaps may be provided between each layer to allow relative movement between the layers of copper sheets, allowing the multi-layered buss bar 150 to be flexible, such as to bend to lengthen or shorten the multi-layered buss bar 150. The gaps may be thin. For example, the gaps may be thinner than the thickness of one layer of copper sheet.

The openings 170, 172 extend through all of the layers. Increasing the number of layers increases the current carrying capabilities of the multi-layered buss bar 150. Using a thin copper sheet that is folded over multiple times allows the flexible section 164 to remain flexible irrespective of the overall thickness of the multi-layered buss bar 150. For example, each layer remains relatively thin and flexible, but having multiple layers increases the overall amount of copper for carrying the current between the first mounting portion 160 and the second mounting portion 162. In an exemplary embodiment, the folds 174 remain intact along the sides 176, 178 of the multi-layered buss bar 150 along the first mounting portion 160 and the second mounting portion 162. However, the folds 174 are removed along the sides 176, 178 in the flexible section 164, making the flexible section 164 more flexible by separating the individual sheet layers from one another.

Figure 5:
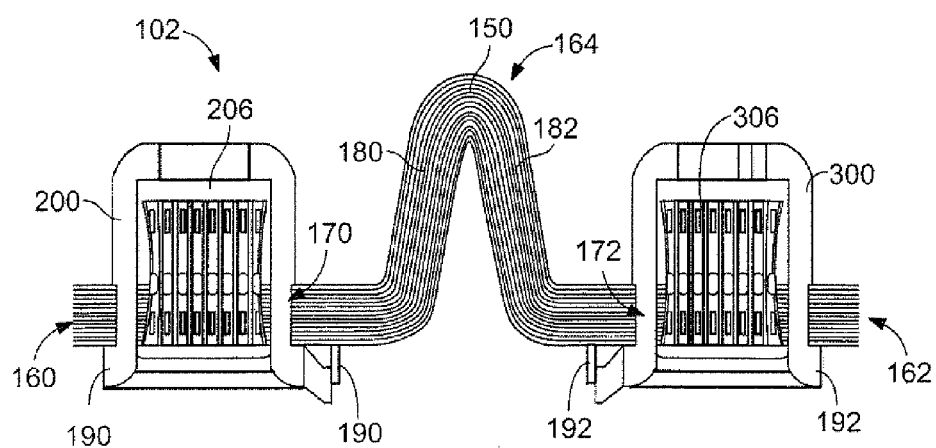
FIG. 5 is a cross-sectional view of a portion of the power terminal connector shown in FIG. 3.

FIG. 5 is a cross-sectional view of a portion of the power terminal connector 102 showing the multi-layered buss bar 150 with the terminal bodies 200, 300 coupled to the multi-layered buss bar 150. The flexible section 164 is shown in a bent state, positioning the first mounting portion 160 closer to the second mounting portion 162 than when the flexible section 164 is relatively flat. In the illustrated embodiment, the flexible section 164 is V-shaped defined by first leg 180 and a second leg 182. The first and second legs 180, 182 are movable with respect to one another to vary an axial position of the first mounting portion 160 and the second mounting portion 162.

The terminals bodies 200, 300 are loaded into the multi-layered buss bar 150 through the openings 170, 172, respectively. In an exemplary embodiment, the terminal bodies 200, 300 are held in the multi-layered buss bar 150 by an interference fit. The outer surface of the terminal bodies 200, 300 directly engage, and are electrically connected to, each of the layers of the copper sheet of the multi-layered buss bar 150. In an exemplary embodiment, the terminal bodies 200, 300 include flanges 190, 192, respectively, at the bottom of the terminal bodies 200, 300. The flanges 190, 192 engage the bottom of the multi-layered buss bar 150 to electrically connect the terminal bodies 200, 300 to the multi-layered buss bar 150. The flanges 190, 192 define stops or limits to the loading of the terminal bodies 200, 300 into the multi-layered buss bar 150. Upper portions of the terminal bodies 200, 300 extend through the multi-layered buss bar 150 and extend upward from the top surface of the multi-layered buss bar 150. The upper portions of the terminal bodies 200, 300 are configured to be loaded into the housings 204, 304 (both shown in FIG. 3) and caps 208, 308 (both shown in FIG. 3). The spring clips 206, 306 are disposed in the terminal bodies 200, 300, respectively, for engaging the pins 124, 126 (both shown in FIG. 2).

Figure 6:
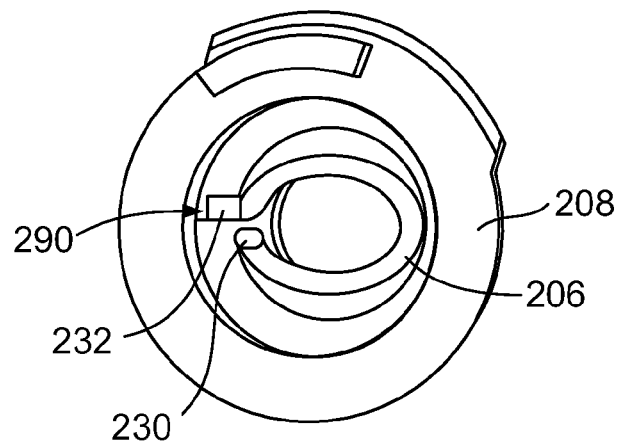
FIG. 6 is a bottom view of a cap of the power terminal connector.

FIG. 6 is a bottom view of the cap 208 with the spring clip 206 received therein. The second end 232 of the spring clip 206 is captured in a pocket 290 in the cap 208. The second end 232 is fixed in position relative to the cap 208, wherein rotation of the cap 208 moves the second end 232 away from the first end 230 to open or enlarge the ring shape of the spring clip 206, thereby allowing the spring clip 206 to be disengaged from the pin 124.

Figure 7:
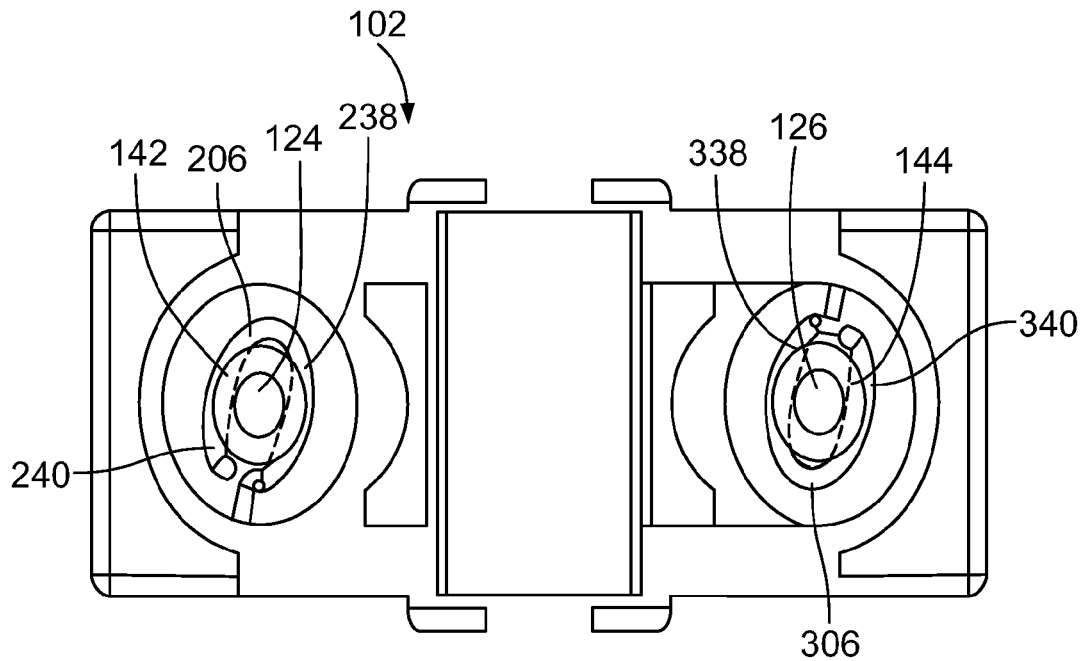
FIG. 7 is a top view of a portion of the power terminal connector.

FIG. 7 is a top view of the power terminal connector 102 with the caps 208, 308 (both shown in FIG. 3) removed for clarity. The spring clips 206, 306 are shown in locking positions with respect to the pins 124, 126. The first and second arms 238, 240 of the spring clip 206 are received in the groove 138 (shown in FIG. 2) of the pin 124 below the pin head 142. The spring clip 206 is locked onto the pin 124. The first and second arms 338, 340 of the spring clip 306 are received in the groove 140 (shown in FIG. 2) of the pin 126 below the pin head 144. The spring clip 306 is locked onto the pin 126.

Figure 8:
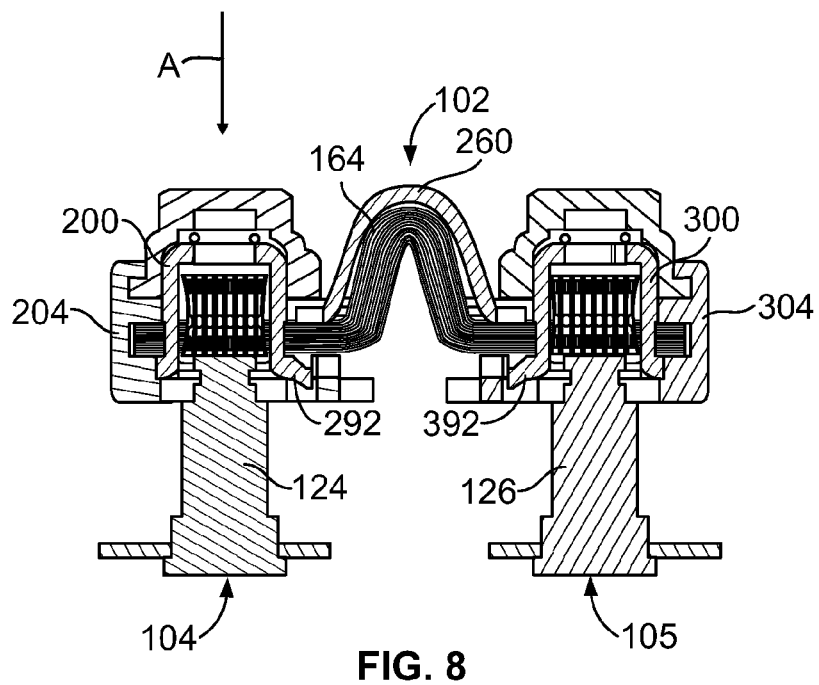
FIG. 8 is a cross-sectional view of the power terminal connector being coupled to the power terminals.

FIG. 8 is a cross-sectional view of the power terminal connector 102 being coupled to the power terminals 104, 105. The power terminal connector 102 is loaded onto the pins 124, 126 generally along the pin axes, such as in a loading direction shown by arrow A. The terminal bodies 200, 300 are aligned with the pins 124, 126. The flexible section 164 allows the terminal bodies 200, 300 to be axially spaced apart at a range of distances to properly align with the pins 124, 126. The spacer 260 covers the flexible section 164 and the flexible section 164 is movable within the area under the spacer 260.

In an exemplary embodiment, the terminal body 200 includes a locking lance 292 extending downward therefrom. The locking lance 292 extends into a corresponding opening in the housing 204 to secure the terminal body 200 in the housing 204. The terminal body 300 includes a locking lance 392 extending downward therefrom. The locking lance 392 extends into a corresponding opening in the housing 304 to secure the terminal body 300 in the housing 304.

Figure 9:
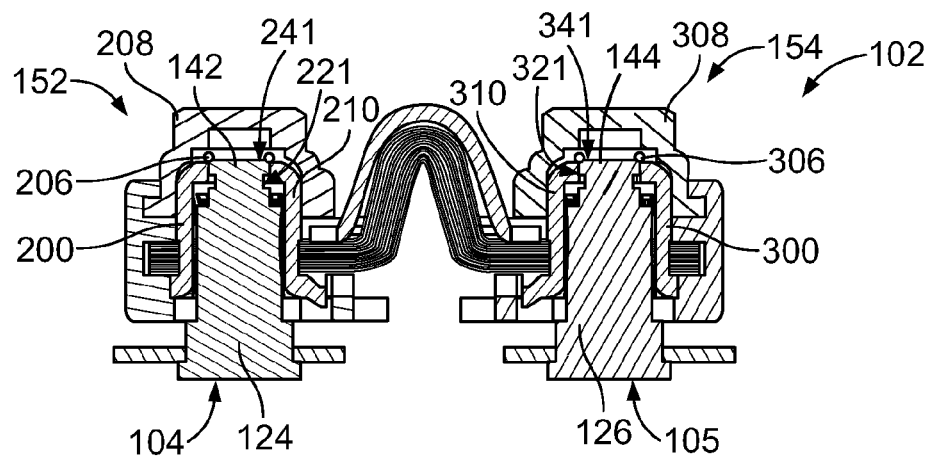
FIG. 9 is a cross section view of the power terminal connector being coupled to the power terminals.

FIG. 9 is a cross section view of the power terminal connector 102 being coupled to the power terminals 104, 105. FIG. 9 shows an intermediate stage of assembly. The power terminal connector 102 is electrically connected to the power terminals 104, 105, however the power terminal connector 102 is in an unseated position. The power terminal connector 102 should be fully seated and locked for proper use.

In the unseated position, the power terminal connector 102 is loaded onto the pins 124, 126 such that the pins 124, 126 are received in the terminal bodies 200, 300. The pins 124, 126 extend through the upper openings 221, 321 of the sockets 210, 310. The spring clips 206, 306 interfere with the distal ends of the pins 124, 126, stopping the pins 124, 126 from being fully loaded into the power terminal connector 102. The width of the opening between the first and second arms 238, 240 of the spring clip 206 is narrower than the diameter of the pin head 142. The width of the opening between the first and second arms 338, 340 of the spring clip 306 is narrower than the diameter of the pin head 144. In order for the pins 124, 126 to pass through the spring clips 206, 306, and thus allowing the power terminal connector 102 to move to the fully seated position, the spring clips 206, 306 must be moved to the clearance positions. The caps 208, 308 are rotated to move the second ends 232, 332 (both shown in FIG. 3) with respect to the first ends 230, 330 (both shown in FIG. 3) to spread the second arms 240, 340 apart from the first arms 238, 338 to widen the openings 241, 341, allowing the power terminal connector 102 to be fully seated on the pins 124, 126.

The caps 208, 308 may be moved in other ways to seat the power terminal connector 102. For example, the caps 208, 308, or more generally the first and second terminal assemblies 152, 154, may be pressed downward to apply a vertical down force on the power terminal connector 102, which may force the spring clips 206, 306 to slide along the large radius of the pins 124, 126 until the spring clip 206, 306 clears the pin heads 142, 144. The spring clip 206 may be spread apart to the clearance position by the interaction with the pins 124, 126 when the power terminal connector 102 is pressed in a vertically downward direction on the pin 124. The first and second terminal assemblies 152, 154 may be quickly connected to the pins 124, 126 by pressing the first and second terminal assemblies 152, 154 onto the pins 124, 126 either with rotation of the caps 208, 308 or by simply overcoming the spring clip force to move the spring clips 206, 306 to the clearance positions.

Figure 10:
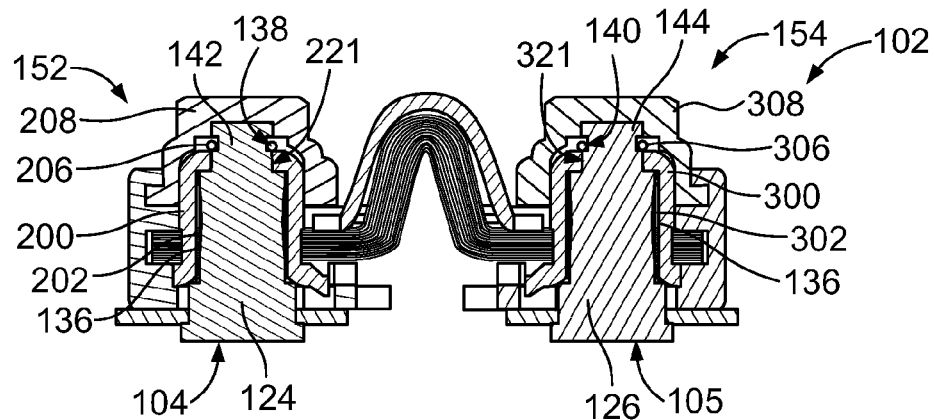
FIG. 10 is a cross-sectional view of the power terminal connector in a seated and locked state on the power terminals.

FIG. 10 is a cross-sectional view of the power terminal connector 102 in a seated and locked state on the power terminals 104, 105. In the fully seated state, the pins 124, 126 are fully loaded into the terminal bodies 200, 300. The contact springs 202, 302 engages the contact surfaces 136 of the pins 124, 126. The contact springs 202, 302 electrically interconnect the pins 124, 126 and the terminal bodies 200, 300, respectively. The pin heads 142, 144 extend through the upper openings 221, 321 and through the spring clips 206, 306 into the caps 208, 308. In the seated state, the spring clips 206, 308 are captured in the grooves 138, 140.

The spring clip 206 is in the locking position, in which the first and second arms 238, 240 are positioned in the groove 138, which has a smaller radius than the pin head 142, below the pin head 142. The pin head 142 captures the spring clip 206 to lock the relative position of the first terminal assembly 152 with respect to the pin 124. The spring clip 306 is in the locking position, in which the first and second arms 338, 340 are positioned in the groove 140, which has a smaller radius than the pin head 144, below the pin head 144. The pin head 144 captures the spring clip 306 to lock the relative position of the second terminal assembly 154 with respect to the pin 126.

To unlock the spring clips 206, 306 from the pins 124, 126, the spring clips 206, 306 must be moved to the clearance positions. For example, the caps 208, 308 may be rotated to rotate the second ends 232, 332 (shown in FIG. 3) with respect to the first ends 230, 330. Rotation of the caps 208, 308 spreads the second arms 240, 340 apart from the first arms 238, 338 and widens the openings 241, 341 at least as wide as the pin heads 142, 144. The spring clips 206, 306 are disengaged from the pins 124, 126 in the clearance position. Once the power terminal connector 102 is in the unlocked position and the spring clips 206, 306 are in the clearance positions, the power terminal connector 102 may be unconnected from the pins 124, 126 by lifting the power terminal connector 102 off of the pins 124, 126 in a direction generally parallel to the pin axes, such as in the direction of arrow B.

FIG. 11 is a side perspective view of a power terminal connector 402 formed in accordance with an exemplary embodiment. The power terminal connector 402 includes a multi-layered buss bar 450, a first terminal assembly 452 coupled to the multi-layered buss bar 450 and a second terminal assembly 454 coupled to the multi-layered buss bar 450. The first terminal assembly 452 is configured to be coupled to the first pin 124 (shown in FIG. 2). The second terminal assembly 454 is configured to be coupled to the second pin 126 (shown in FIG. 2). The multi-layered buss bar 450 is flexible and allows for lengthening or shortening the multi-layered buss bar 450 to change the relative positions between the first terminal assembly 452 and the second terminal assembly 454, for mounting to the pins 124, 126 which may be at various distances from one another and/or to accommodate vibrations after connection to the pins 124, 126.

The multi-layered buss bar 450 may be substantially similar to the multi-layered buss bar 150. The multi-layered buss bar 450 includes a first mounting portion 460, a second mounting portion 462 and a flexible section 464 between the first and second mounting portions 460, 462. In an exemplary embodiment, the first mounting portion 460, second mounting portion 462 and/or flexible section 464 has multiple layers of metal sheets in a stacked configuration. The flexible section 464 is configured to change shape to change the relative position of the first and second mounting portions 460, 462. The multi-layered buss bar 450 is electrically conductive. In an exemplary embodiment, the multi-layered buss bar 450 is manufactured from copper, however other materials may be used in alternative embodiments. The copper sheet is folded over multiple times to define multiple layers of copper sheets in a stacked configuration spanning the first mounting portion 460, the second mounting portion 462 and the flexible section 464.

The first terminal assembly 452 includes a terminal body 470 that is configured to be electrically connected to the multi-layered buss bar 450 and the pin 124. The terminal body 470 includes a socket 472 that is configured to receive the pin 124. The terminal body 470 may be terminated to the battery by other means or by using other features in alternative embodiments, including when a different type of terminal other than a pin is provided at the battery or other electrical component, such as by using a nut, a bolt, a blade, a pin or another type of connector. Optionally, the first terminal assembly 452 may include a housing or other covering for the terminal body 470. The housing may be used to position and/or secure the terminal body 470 to the pin 124.

The second terminal assembly 454 includes a terminal body 480 that is configured to be electrically connected to the multi-layered buss bar 450 and the pin 126. The terminal body 480 includes a socket 482 that is configured to receive the pin 126. The terminal body 480 may be terminated to the battery by other means or by using other features in alternative embodiments, including when a different type of terminal other than a pin is provided at the battery or other electrical component, such as by using a nut, a bolt, a blade, a pin or another type of connector. Optionally, the second terminal assembly 454 may include a housing or other covering for the terminal body 480. The housing may be used to position and/or secure the terminal body 480 to the pin 126.

FIG. 12 is a side perspective view of a power terminal connector 502 formed in accordance with an exemplary embodiment. The power terminal connector 502 includes a buss bar assembly 540. The buss bar assembly 540 includes a first multi-layered buss bar 542 and a second multi-layered buss bar 544. The buss bar assembly 540 defines a two-stacked buss bar assembly. Optionally, the first and second multi-layered buss bars 542, 544 may be substantially similar to one another. Providing multiple multi-layered buss bars 542, 544 within the buss bar assembly 540 allows the buss bar assembly 540 to pass a higher current than a buss bar assembly having fewer layers.

The power terminal connector 502 includes a first terminal assembly 552 coupled to the buss bar assembly 540 and a second terminal assembly 554 coupled to the buss bar assembly 540. The first and second terminal assemblies 552, 554 may be substantially similar to the first and second terminal assemblies 452, 454 (shown in FIG. 11). The first terminal assembly 552 is configured to be coupled to the first pin 124 (shown in FIG. 2). The second terminal assembly 554 is configured to be coupled to the second pin 126 (shown in FIG. 2). The first and second multi-layered buss bars 542, 544 are flexible and allow for lengthening or shortening the buss bar assembly 540 to change the relative positions between the first terminal assembly 552 and the second terminal assembly 554, for mounting to the pins 124, 126 which may be at various distances from one another and/or to accommodate vibrations after connection to the pins 124, 126.

The first and second multi-layered buss bars 542, 544 may each be substantially similar to the multi-layered buss bar 150. Each multi-layered buss bar 542, 544 includes a first mounting portion 560, a second mounting portion 562 and a flexible section 564 between the first and second mounting portions 560, 562. In an exemplary embodiment, the first mounting portion 560, second mounting portion 562 and/or flexible section 564 has multiple layers of metal sheets in a stacked configuration. The flexible section 564 is configured to change shape to change the relative position of the first and second mounting portions 560, 562. The first and second multi-layered buss bars 542, 544 are electrically conductive. In an exemplary embodiment, the first and second multi-layered buss bars 542, 544 are manufactured from copper, however other materials may be used in alternative embodiments. The copper sheet is folded over multiple times to define multiple layers of copper sheets in a stacked configuration spanning the first mounting portion 560, the second mounting portion 562 and the flexible section 564. Any number of folds, and thereby sheets, may be provided. Providing multiple multi-layered buss bars 542, 544 within the two stacked buss bar assembly 540 allows the buss bar assembly 540 to pass a higher current than a single, multi-layer buss bar assembly.

Optionally, a gap 566 is provided between the flexible sections 564 of the first and second multi-layered buss bars 542, 544. The gap 566 allows relative movement between the first and second multi-layered buss bars 542, 544, such as to allow the flexible sections 564 to bend or move relative to one another.

FIG. 13 is a side perspective view of a power terminal connector 602 formed in accordance with an exemplary embodiment. The power terminal connector 602 includes a buss bar assembly 640. The buss bar assembly 640 includes a first multi-layered buss bar 642, a second multi-layered buss bar 644 and a third multi-layered buss bar 646. The buss bar assembly 640 defines a three-stacked buss bar assembly. Optionally, the multi-layered buss bars 642, 644, 646 may be substantially similar to one another. Providing multiple multi-layered buss bars 642, 644, 646 within the buss bar assembly 640 allows the buss bar assembly 640 to pass a higher current than a buss bar assembly having fewer layers.

The power terminal connector 602 includes a first terminal assembly 652 coupled to the buss bar assembly 640 and a second terminal assembly 654 coupled to the buss bar assembly 640. The first and second terminal assemblies 652, 654 may be substantially similar to the first and second terminal assemblies 452, 454 (shown in FIG. 11). The first terminal assembly 652 is configured to be coupled to the first pin 124 (shown in FIG. 2). The second terminal assembly 654 is configured to be coupled to the second pin 126 (shown in FIG. 2). The multi-layered buss bars 642, 644, 646 are flexible and allow for lengthening or shortening the buss bar assembly 640 to change the relative positions between the first terminal assembly 652 and the second terminal assembly 654, for mounting to the pins 124, 126 which may be at various distances from one another and/or to accommodate vibrations after connection to the pins 124, 126.

The multi-layered buss bars 642, 644, 646 may each be substantially similar to the multi-layered buss bar 150. Each multi-layered buss bars 642, 644, 646 includes a first mounting portion 660, a second mounting portion 662 and a flexible section 664 between the first and second mounting portions 660, 662. In an exemplary embodiment, the first mounting portion 660, second mounting portion 662 and/or flexible section 664 have multiple layers of metal sheets in a stacked configuration. The flexible section 664 is configured to change shape to change the relative position of the first and second mounting portions 660, 662. The multi-layered buss bars 642, 644, 646 are electrically conductive. In an exemplary embodiment, the multi-layered buss bars 642, 644, 646 are manufactured from copper, however other materials may be used in alternative embodiments. The copper sheet is folded over multiple times to define multiple layers of copper sheets in a stacked configuration spanning the first mounting portion 660, the second mounting portion 662 and the flexible section 664. Any number of folds, and thereby sheets, may be provided. Providing multiple multi-layered buss bars 642, 644, 646 within the three stacked buss bar assembly 640 allows the three stacked buss bar assembly 640 to pass a higher current than a two stacked buss bar assembly or a single, multi-layered buss bar assembly.

Optionally, gaps 667, 668 are provided between the flexible sections 664 of the multi-layered buss bars 642, 644, 646. The gaps 667, 668 allow relative movement between the multi-layered buss bars 642, 644, 646, such as to allow the flexible sections 664 to bend or move relative to one another.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A power terminal connector comprising:
    a multi-layered buss bar having a first mounting portion, a second mounting portion and a flexible section between the first and second mounting portions, the multi-layered buss bar having multiple layers of metal sheets in a stacked configuration, the metal sheets being folded over multiple times to define multiple layers of metal sheets spanning the first mounting portion, the flexible section and the second mounting portion, the metal sheets having folds at edges of the folded over portions along the first mounting portion and the second mounting portion, the flexible section being devoid of any folds along the edges;
    a first terminal assembly coupled to the first mounting portion and a second terminal assembly coupled to the second mounting portion, the first and second terminal assemblies being configured to be coupled to corresponding pins of corresponding power terminals;
    wherein the multi-layered buss bar is configured to electrically interconnect the power terminals coupled to the first and second terminal assemblies.

2. The power terminal connector of claim 1, wherein the multi-layered buss bar includes openings through the first and second mounting portions, the first and second terminal assemblies including terminal bodies separately provided from, and received in the openings of, the multi-layered buss bar, the terminal bodies having sockets being configured to receive the pins of corresponding power terminals.

3. The power terminal connector of claim 1, wherein the multi-layered buss bar includes at least one copper sheet folded over to define at least two layers spanning the first mounting portion, the second mounting portion, and the flexible section.

4. The power terminal connector of claim 1, wherein the multi-layered buss bar includes at least one copper sheet folder over to define at least two layers, the multi-layered buss bar being V-shaped in the flexible section defined by a first leg and a second leg, the first and second legs being moveable with respect to one another to vary an axial position of the first mounting portion with respect to the second mounting portion.

5. The power terminal connector of claim 1, wherein the multiple layers of metal sheets are separated by gaps allowing the metal sheets to bend.

6. The power terminal connector of claim 1, further comprising a second multi-layered buss bar having a first mounting portion, a second mounting portion and a flexible section between the first and second mounting portions of the second multi-layered buss bar, the flexible section of the second multi-layered buss bar having multiple layers of metal sheets in a stacked configuration, the second multi-layered buss bar being stacked on the other multi-layered buss bar to define a buss bar assembly coupled to the first and second terminal assemblies.

7. The power terminal connector of claim 1, wherein the folds are removed at the flexible section.

8. The power terminal connector of claim 1, further comprising a first terminal assembly coupled to the corresponding mounting portion and a second terminal assembly coupled to the second mounting portion, each of the first and second terminal assemblies comprising a terminal body separately provided from, and coupled to, the corresponding mounting portion, the terminal body having a socket configured to receive, and be electrically connected to, a pin of a corresponding power terminal, wherein the multi-layered buss bar electrically couples the terminal bodies of the first and second terminal assemblies to electrically interconnect the pins received therein.

9. The power terminal connector of claim 1, further comprising a first terminal assembly coupled to the corresponding mounting portion and a second terminal assembly coupled to the second mounting portion, each of the first and second terminal assemblies comprising:
  a terminal body separately provided from, and coupled to, the corresponding mounting portion, the terminal body having a socket configured to receive, and be electrically connected to, a pin of a corresponding power terminal;
  a spring clip coupled to the terminal body, the spring clip being movable between a locking position and a clearance position, the spring clip being configured to engage the pin in the locking position to secure the corresponding terminal assembly to the pin, the spring clip being configured to be disengaged from the pin in the clearance position; and
  a cap movable with respect to the terminal body, the cap being coupled to the spring clip to move the spring clip between the locking position and the clearance position as the cap is actuated;
  wherein the multi-layered buss bar electrically couples the terminal bodies of the first and second terminal assemblies to electrically interconnect the pins received therein.

10. A power terminal connector comprising:
  a multi-layered buss bar having a first mounting portion, a second mounting portion and a flexible section between the first and second mounting portions, the flexible section having multiple layers of metal sheets in a stacked configuration;
  a first terminal assembly coupled to the corresponding mounting portion and a second terminal assembly coupled to the second mounting portion, each of the first and second terminal assemblies comprising:
    a terminal body separately provided from, and coupled to, the corresponding mounting portion, the terminal body having a socket configured to receive, and be electrically connected to, a pin of a corresponding power terminal;
    a spring clip coupled to the terminal body, the spring clip being movable between a locking position and a clearance position, the spring clip being configured to engage the pin in the locking position to secure the corresponding terminal assembly to the pin, the spring clip being configured to be disengaged from the pin in the clearance position; and
    a cap movable with respect to the terminal body, the cap being coupled to the spring clip to move the spring clip between the locking position and the clearance position as the cap is actuated;
  wherein the multi-layered buss bar electrically couples the terminal bodies of the first and second terminal assemblies to electrically interconnect the pins received therein.

11. The power terminal connector of claim 10, wherein the multi-layered buss bar includes openings through the first and second mounting portions, the first and second terminal assemblies received in the openings of the multi-layered buss bar.

12. The power terminal connector of claim 10, wherein the multi-layered buss bar includes at least one copper sheet folded over to define at least two layers spanning the first mounting portion, the second mounting portion, and the flexible section.

13. The power terminal connector of claim 10, wherein the multi-layered buss bar includes at least one copper sheet folder over to define at least two layers, the multi-layered buss bar being V-shaped in the flexible section defined by a first leg and a second leg, the first and second legs being moveable with respect to one another to vary an axial position of the first mounting portion with respect to the second mounting portion.

14. The power terminal connector of claim 10, wherein the multiple layers of metal sheets are separated by gaps allowing the metal sheets to bend.

15. The power terminal connector of claim 10, further comprising a second multi-layered buss bar having a first mounting portion, a second mounting portion and a flexible section between the first and second mounting portions of the second multi-layered buss bar, the flexible section of the second multi-layered buss bar having multiple layers of metal sheets in a stacked configuration, the second multi-layered buss bar being stacked on the other multi-layered buss bar to define a buss bar assembly coupled to the first and second terminal assemblies.

16. The power terminal connector of claim 10, wherein the metal sheets are folded over to define folds at edges of the multi-layered buss bar, the folds remain intact at the first mounting portion and the second mounting portion, the folds being removed at the flexible section.

17. The power terminal connector of claim 10, wherein the spring clip changes shape when the cap is actuated.

18. The power terminal connector of claim 10, wherein the spring clip includes a first arm and a second arm, the first arm being spread apart from the second arm when the cap is pressed onto the pin.

19. A connector system comprising:
  a first header having a first power terminal, the first power terminal having a pin;
  a second header having a second power terminal, the second power terminal having a pin; and a power terminal connector coupled to and electrically interconnecting the first and second power terminals, the power terminal connector comprising:

a multi-layered buss bar having a first mounting portion, a second mounting portion and a flexible section between the first and second mounting portions, the flexible section having multiple layers of metal sheets in a stacked configuration;

a first terminal assembly coupled to the first mounting portion and a second terminal assembly coupled to the second mounting portion, the first and second terminal assemblies being coupled to the first and second pins, respectively, each of the first and second terminal assemblies comprising:

a terminal body separately provided from, and coupled to, the corresponding first and second mounting portion, the terminal body having a socket configured to receive, and be electrically connected to, a pin of a corresponding power terminal;

a spring clip coupled to the terminal body, the spring clip being movable between a locking position and a clearance position, the spring clip being configured to engage the pin in the locking position to secure the corresponding terminal assembly to the pin, the spring clip being configured to be disengaged from the pin in the clearance position; and a cap movable with respect to the terminal body, the cap being coupled to the spring clip to move the spring clip between the locking position and the clearance position as the cap is actuated;

wherein the multi-layered buss bar electrically couples the terminal bodies of the first and second terminal assemblies to electrically interconnect the pins received therein.

20. The connector system of claim 17, wherein the multi-layered buss bar includes at least one copper sheet folder over to define at least two layers, the multi-layered buss bar being V-shaped in the flexible section defined by a first leg and a second leg, the first and second legs being moveable with respect to one another to vary an axial position of the first mounting portion with respect to the second mounting portion.

* * * * *